(12) United States Patent
Mazzagatti et al.

(10) Patent No.: US 8,250,116 B2
(45) Date of Patent: Aug. 21, 2012

(54) KSTORE DATA SIMULATOR DIRECTIVES AND VALUES PROCESSOR PROCESS AND FILES

(75) Inventors: Jane C. Mazzagatti, Blue Bell, PA (US); Tony Phan, Abington, PA (US)

(73) Assignee: Unisys Corporation, Blue Bell, PA (US)

(*) Notice: Subject to any disclaimer, the term of this patent is extended or adjusted under 35 U.S.C. 154(b) by 624 days.

(21) Appl. No.: 12/319,037

(22) Filed: Dec. 31, 2008

(65) Prior Publication Data

US 2010/0169384 A1 Jul. 1, 2010

(51) Int. Cl.
*G06F 17/30* (2006.01)

(52) U.S. Cl. .................................. 707/803; 707/774
(58) Field of Classification Search .................. None
See application file for complete search history.

(56) References Cited

U.S. PATENT DOCUMENTS

2003/0097650 A1* 5/2003 Bahrs et al. .................... 717/124
2006/0100845 A1* 5/2006 Mazzagatti et al. ............ 703/22
* cited by examiner

*Primary Examiner* — Belix M Ortiz Ditren
(74) *Attorney, Agent, or Firm* — Richard J. Gregson

(57) ABSTRACT

A data simulator receives a set of directives specified in a file and creates one or more datastreams from which a data structure may be built as specified by the directives. The directives may specify configuration settings, constants, changing fields, values and probabilities.

7 Claims, 7 Drawing Sheets

Classic Sharp Cheddar Cheese,11110586063,2lb,4.07,4.79,Kroger,Kroger,Midwest,Cheese
Quaker Oats Oatmeal,3000001350,32oz,3.3,3.79,Quaker,Pepsico,Midwest,Cereal
QUAKER OATMEAL,3000263932,32oz,3.12,3.59,Quaker,Pepsico,Midwest,Cereal
PAMPERS,3700013967,2 doz,15.29,16.99,Procter & Gamble, P&G,Midwest,Pampers
⋮

1001,Kroger,NY,supermarket
6090,Sam's Club,IL,club
3122,A&P,GA,grocery
⋮

KSTORE DATA SIMULATOR DIRECTIVES AND VALUES PROCESSOR PROCESS AND FILES

RELATED APPLICATIONS

This application claims the benefit of U.S. patent application Ser. No. 11/084,996, filed Mar. 18, 2005, entitled "SYSTEM AND METHOD FOR STORING AND ACCESSING DATA IN AN INTERLOCKING TREES DATASTORE" by MAZZAGATTI et al. which application is a Continuation of U.S. patent application Ser. No. 10/385,421, filed Mar. 10, 2003; U.S. patent application Ser. No. 11/185,620, filed Jul. 20, 2005, entitled "METHOD FOR PROCESSING NEW SEQUENCES BEING RECORDED INTO AN INTERLOCKING TREES DATASTORE," by MAZZAGATTI; and U.S. patent application Ser. No. 11/985,623, filed Nov. 16, 2007, entitled "KSTORE SCENARO SIMULATOR PROCESSOR AND XML FILE", by MAZZAGATTI et al. All of these applications are incorporated in their entirety herein.

TECHNICAL FIELD

The present disclosure relates to data processing systems, and simulator to such systems. In particular, the present disclosure relates to data simulator directives and values for a simulator related to an interlocking trees datastore.

BACKGROUND

Software testing includes the process of executing a program or application with the intent of finding errors and is intended to measure the quality of the developed software. It also encompasses providing information about the quality of the product with respect to the context in which it is intended to operate. Although there are many approaches to software testing, effective testing of complex products depends on using test data that faithfully reflects the type of data upon which the software will act and using that data in an environment like the one in which the software will run. Hence it may be helpful to design and test scenarios, where a scenario may be described as an instantiation of a use case (taking a specific path through the model, and assigning context-specific values to each variable). More complex tests can be built up by designing a test that runs through a series of scenarios. Unfortunately, obtaining or generating such data for scenario testing is not easy. Even if "live data" is available, security considerations may render that data unavailable.

SUMMARY

Directives including configuration settings, constants, changing fields, valid values and probabilities are provided to a directives and values processor. A directives and values processor may initiate one or more data simulators or the directives are provided directly to the directives and values processor which itself is a data simulator. The data simulator(s) create one or more datastreams based on the directives to generate scenario-specific data. The directives may be provided in one or more files or on the command line. The data created by the data simulator(s) may be organized into a tree-like data structure known as a KStore or K. A KStore is a datastore of root nodes and non-root nodes organized into a number of connected trees. The nodes of the KStore include elemental root nodes, subcomponent nodes and end product nodes linked together to form connected or interlocking trees. The connected trees of the KStore are of two types called herein Case or asCase trees comprised of asCase branches and Result or asResult trees comprised of asResult branches. A Case tree is a type of tree comprising a root node and one or more non-root nodes. A Result tree is a second type of tree comprised of a second root node and one or more non-root nodes common with the nodes of the Case tree. Each node in the KStore includes at least four pointers. An elemental node is a root node comprised of a first pointer which is null (a first null pointer), a second null pointer, a third null pointer and a fourth pointer pointing to a list of pointers to nodes, this list comprising nodes whose second pointers point to the elemental node. A subcomponent node is a non-root node and comprises a first pointer to a first node, the first node comprising a first portion of the subcomponent node, a second pointer to a second node, the second node comprising a second portion of the subcomponent node, a third pointer pointing to a first list of pointers to nodes, the first list comprising nodes which include the subcomponent as their first portion and a fourth null pointer. An non-root end product node comprises at least a first pointer to a first portion, a second pointer to an ending indicator second portion, a third null pointer and a fourth pointer pointing to a second list of pointers to nodes, the second list comprising nodes which include the end product node as their second portion. A root node representing a begin indicator comprises a first null pointer, a second null pointer, a third pointer pointing to a first list of pointers to nodes, the first list comprising nodes comprising the begin indicator as a first portion and a fourth null pointer. A root node representing a dataset element comprises a first null pointer, a second null pointer, a third null pointer and a fourth pointer pointing to a second list of pointers to nodes, the second list comprising nodes comprising the dataset element as a second portion. A root node representing an end product comprises a first null pointer, a second null pointer, a third null pointer and a fourth pointer pointing to a second list of pointers to nodes, the second list comprising nodes of a second level of the KStore comprising the end product as a second portion. The structure and usefulness of the KStore data structure is described more fully below.

DETAILED DESCRIPTION

Overview

Figure 1:
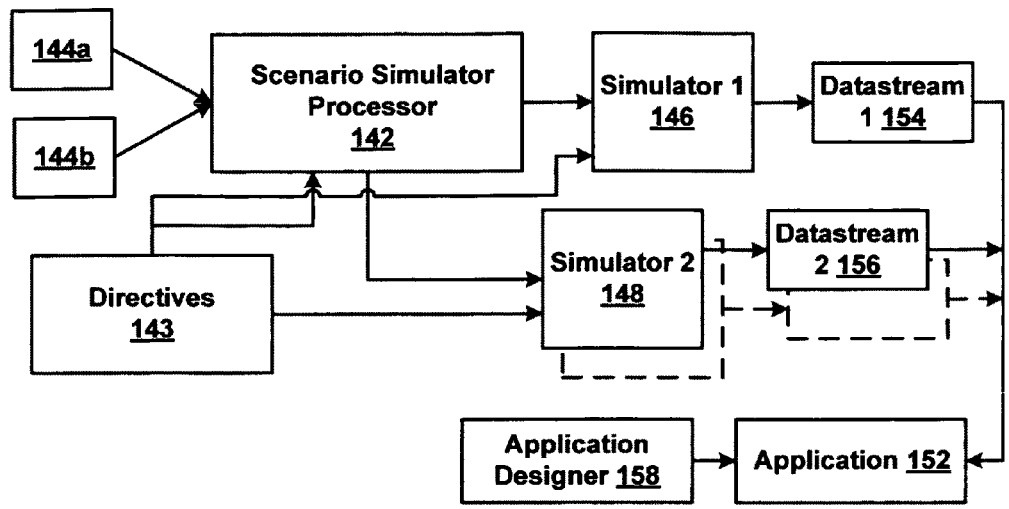
FIG. 1 is a block diagram illustrating a system for generating and processing scenario data in accordance with some embodiments of the invention.

Creating and using interlocking trees datastores and various features of interlocking trees datastore systems (referred to herein as "KStore" or just "K") have been described in U.S. Pat. Nos. 6,961,733, and 7,158,975 and in co-pending U.S. patent application Ser. No. 11/084,996 published as US20050165772 by inventor Mazzagatti and are hereby incorporated herein in their entireties. A system in which such interlocking trees datastores can be used has been described in U.S. patent application Ser. No. 10/879,329 entitled "Functional operations for accessing and/or building interlocking trees datastores to enable their use with applications software," which is hereby incorporated by reference in its entirety. Embodiments of the invention described herein can be adapted to operations described in U.S. Pat. No. 7,213,041 and in co-pending U.S. patent application Ser. No. 10/759,466 (now published as US 20050165749) entitled "Saving and restoring an interlocking trees datastore" which are hereby incorporated by reference in their entireties. An application designer is described in co-pending U.S. patent application Ser. No. 11/373,730 entitled "KStore Application Designer" and is hereby incorporated by reference in its entirety. Real time data simulation for a KStore is described in co-pending U.S. patent application Ser. No. 11/106,253 (published as US 20060100845) and is incorporated by reference in its entirety.

Embodiments of the invention described herein provide input to a data simulator directives and values processor directly or through interim software, such as a scenario simulator processor described in co-pending U.S. patent application Ser. No. 11/985,623, filed Nov. 16, 2007, entitled "KSTORE SCENARIO SIMULATOR PROCESSOR AND XML FILE", by MAZZAGATTI et al., incorporated by reference in its entirety, so that the datastream(s) or datastream(s)/data structure that is created represents a desired scenario. In some embodiments of the invention, a developer, using object-oriented drag and drop methods, is able to build and test a custom GUI application that incorporates and associates KStore analytics with live, static or dynamic data representing a desired scenario, as specified by the directives file. Unlike known systems, embodiments of the directive-driven KStore data simulator described herein comprise a single step such that test data generation, application designing and testing occur together in one single phase, so that a developer can generate test data, design an application and test the application at the same time, using production data that has been loaded into KStore and is based on a contemplated context or scenario. Because the system uses KStore access APIs to access the interlocking trees datastore, the KStore datastore is protected from accidental corruption by the application being developed. The developer does not have to wait for runtime to determine whether or not the application works as desired. Because the developer can use data simulating a particular use (scenario data), it is instantly obvious (as the application is being built) if the analytics are working with the data as desired and if the GUI design shows the data properly.

Embodiments of the KStore application designer also provide the ability to develop applications rapidly without having to understand how a KStore is built or accessed. By creating one or more directives and values files used to specify the generation of datastream(s) reflective of real data in a real context, a developer can build a data store that reflects the particular characteristics of a user's data and context. Embodiments of the invention can include a graphical user interface (GUI) that provides a workspace on which to view the structure built according to the directives provided and alter the structure on-the-fly. Furthermore, because the directives provided to the directives and values processor can be provided via a (potentially declarative) directives file, a developer does not need to be a programmer or to understand the technical aspects of the KStore data structure to build a data store that captures the characteristics of a particular universe of data. Although described in relation to KStore, it should be readily apparent that embodiments described herein may also be applicable to similar data structures developed in the future.

KStore Data Simulator Directives and Values Processor Process and Files

Directives characterizing data to be produced are provided to a directives and values processor that creates one or more data streams in accordance with the directives and sample data provided by the one or more files. In some embodiments of the invention, the directives and values processor receives directives in one or more files and invokes one or more data simulators creating one or more data streams in accordance with the directives and sample data provided by the one or more files. In some embodiments of the invention, a data structure is built from the datastream(s). In some embodiments, a declarative file identifies the file name or names of the file or files that include the directives in accordance with which the datastreams are generated. In some embodiments of the invention, the directives are provided directly to the data simulators. Each of the datastreams and thus, the data structure if one is produced, represent scenario data as characterized by the directives.

If a declarative file identifies the file name or names of the file or files that include the directives, the declarative file may include multiple sets of information corresponding to one or more scenarios (one set for each scenario). Each set of scenario information may include one or more of the following pieces of information: configuration settings for the data simulator(s), constants for the data simulator, a list of changing fields, valid values and probabilities, and so on as described more fully below. In some embodiments of the invention, the directives are provided on the command line. In some embodiments of the invention, the datastream(s) is/are processed by an application, which can be modified or created via an application designer while the datastreams are being produced. In some embodiments of the invention, the datastream(s) are used to generate or build a data structure and the data structure is processed by an application, which can be modified or created via an application designer while the datastreams are being produced and the data structure is being built.

FIG. 1 illustrates an example of a system that generates scenario-specific data in accordance with some embodiments of the invention. In some embodiments of the invention, a directives and values processor such as scenario simulator processor 142 receives a directives file 143 and one or more files, 144a, 144b, etc. and invokes one or more data simulators such as data simulator 1 146, data simulator 2 148, etc. to generate one or more datastreams such as datastream 1 154, datastream 2 156, etc. Alternatively, the directives 143 may be provided directly to the directives and values processor, which may itself be a data simulator(s). Datastreams 154, 156, etc. may be acted upon by an application 152 as the datastreams are generated. In some embodiments of the invention a data structure (not shown) is created from the one or more datastreams 154, 156, etc. The resultant data structure may be acted upon by an application as the datastreams 154, 156, etc. are generated and the data structure is being generated or built. In some embodiments of the invention, an application designer 158 may create or modify the application 152 as the datastreams 154, 156, etc. are being generated or as the datastreams 154, 156, etc. are being generated and a data structure (not shown) is being built. In some embodiments the files 144a, 144b are identified by a declarative scenarios file (not shown). In some embodiments of the invention the declarative scenarios file is an XML file.

Figure 2A:
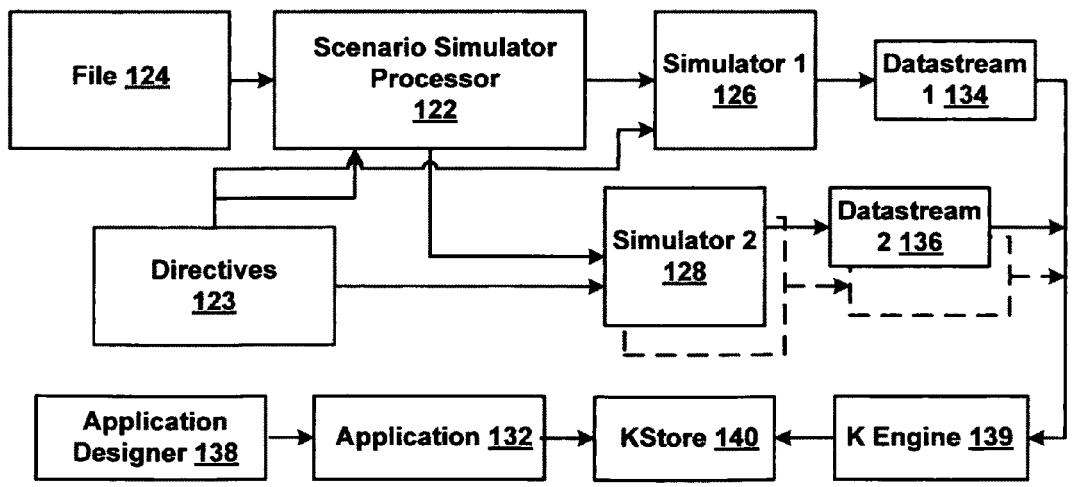
FIGS. 2a and 2b are block diagrams illustrating systems for generating and processing scenario data in which a KStore data structure is built in accordance with some embodiments of the invention.

FIG. 2a illustrates another example of a system that generates scenario-specific data in accordance with some embodiments of the invention. In some embodiments, a directives and values processor such as scenario simulator processor 122 receives directives 123 and one or more files represented by file 124 and invokes one or more data simulators such as data simulator 1 126, data simulator 2 128, etc. to generate one or more datastreams such as datastream 1 134, datastream 2 136, etc. for input to a K Engine 139 to create a KStore data structure 140. Alternatively, the directives 123 may be provided directly to the directives and values processor, which may itself be a data simulator(s). The resultant KStore data structure 140 may be acted upon by an application 132 as the datastreams 134, 136, etc. are generated and the KStore data structure 140 is being built. In some embodiments of the invention, an application designer 138 may create and/or modify the application 132 while the datastreams 134, 136, etc are generated and the KStore data structure 140 is being generated. In some embodiments the one or more files 124 are identified or specified in a declarative scenarios file (not shown), which may be an XML file. The XML file may specify a number of sets of files, each set of files representing one scenario, or a number of files, where each file represents one scenario.

Directives may be provided including configuration settings, constants, changing fields, valid values and probabilities. The directives may be manually created or an application may be employed to assist in the creation of the directives. The directives may be provided in one or more files or entered on the command line or may be provided as a combination of file content and command line commands. In some embodiments of the invention, the data structure 140 comprises a KStore or K, as described in U.S. Pat. Nos. 6,961,733, and 7,158,975.

Figure 2B:
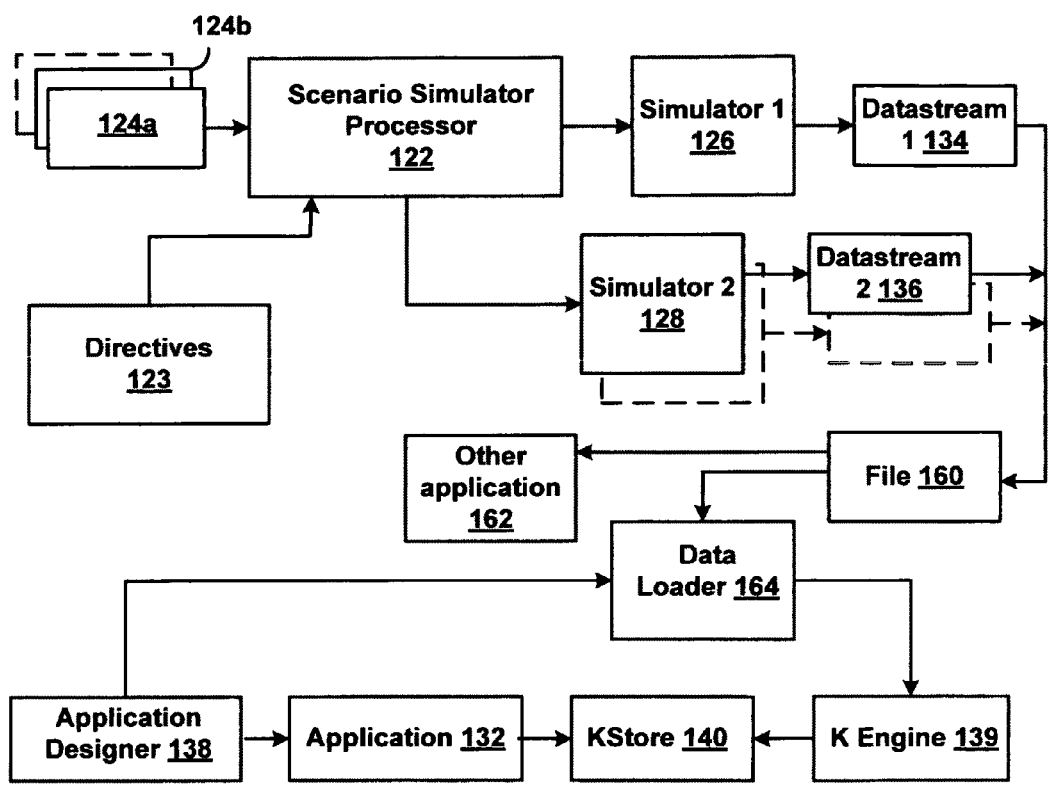

FIG. 2b illustrates another example of a system for generating scenario data in accordance with some embodiments of the invention. In some embodiments, a directives and values processor such as scenario simulator processor 122 receives directives 123 and one or more files 124a, 124b, etc. representing configuration settings, constants, changing fields, valid values and probabilities information and invokes one or more data simulators such as data simulator 1 126, data simulator 2 128, etc. to generate one or more datastreams such as datastream 1 134, datastream 2 136, etc. in accordance with the directives. Alternatively, files 124a, 124b and/or the directives 123 may be provided directly to the directives and values processor, which may itself be a data simulator(s). In some embodiments, the datastream(s) 134, 136, etc. may be persisted to a file 160 for input to an application 162 or for input to a data loader 164 for operation upon by an application designer 138 or K Engine 139 to create a KStore data structure 140. The resultant KStore data structure 140 may be acted upon by an application 132 as the datastreams 134, 136, etc. are generated and the KStore data structure 140 is being built. In some embodiments of the invention, an application designer 138 may create and/or modify the application 132 while the datastreams 134, 136, etc are generated and the KStore data structure 140 is being generated. In some embodiments the one or more files 124a, 124b, etc. are identified or specified by a declarative scenarios file which is input to the scenario simulator processor 122.

The directives file 123 and one or more files 124a, 124b, etc. of FIG. 2b may characterize data representing one or more data simulator scenarios. In some embodiments of the invention these files are manually created files that are used to define simulator datastreams as described above. Alternatively, an application to assist in the creation of the one or more files 124a, 124b, etc. may be used. In some embodiments of the invention, the data structure 140 comprises a KStore or K, as described in U.S. Pat. Nos. 6,961,733, and 7,158,975. In some embodiments, declarative scenarios file (not shown) is an XML file and adheres to an XML schemas.

In some embodiments of the invention a directives file(s) is a .txt file comprising one or more sections including a configuration section, a context section, a transaction section, a column names section, a values section and a probability section. In some embodiments, section headers are enclosed in brackets [ ].

The configuration section may include directives for the data simulator(s) and parameters that are used to define the records produced by the data simulator. The configuration section may define the number of fields per record (e.g., Fields=[number]), the number of variables per field (e.g., Variables=[number]), the number of threads the data simulator will start (e.g., Threads=[number]) and the location to which the generated data is going (e.g., LearnDirect=[parameter]).

An example of a configuration section may be:
[Configuration]
Fields=8
Variables=100
Threads=1
LearnDirect=1

It will be appreciated that in this example, as in the examples that follow, section names, parameters, parameter names, format and values are examples only and do not limit the contemplated embodiments of the inventions. Any suitable section names, parameters, parameter names, format and values can be used. In this sample configuration section, (identified by the "[Configuration]" statement, there are 8 fields per record, 100 possible variables per field, and one thread is to be started by the data simulator. The Learn Direct=1 directive specifies that the data is going directly to a KStore learn engine which will process the data into a K. Other values for the LearnDirect parameter may specify other places the data might go, such as to a named-pipe, to a file, and so on. In some embodiments of the invention, other parameters in the configuration section may include any one or more of the following: a parameter to specify the name of the K model into which the data goes, a parameter to provide information about the named-pipe, a parameter to specify a file name for an XML scenarios file that is input into the values and directives processor, a name of a directives file or constants file, information concerning a type of the directives file or constants file, designation of the created file as XML, .csv or other file type, and other parameters to designate where the data is going. Other configuration section parameters may include parameters that define the data records to be simulated, the fields and variables that make up the simulated data records, the number of records to be generated, whether to generate only unique records without duplicates, or to generate duplicate records, column names, an indication that no column names are to be generated or that column names should be generated, meta data for column name, column data type, valid field variables values (yes/no, or numeric and so on), ontological rules and so on.

The constants section may include directives for the data simulator with respect to replacing the field values of individual fields with values from an indicated file. For example, a directive such as "[user specified column name]=filename.ext" specifies the column in the current record and the file that includes replacement data for the field values.

Figures 3A, 3B, 4:
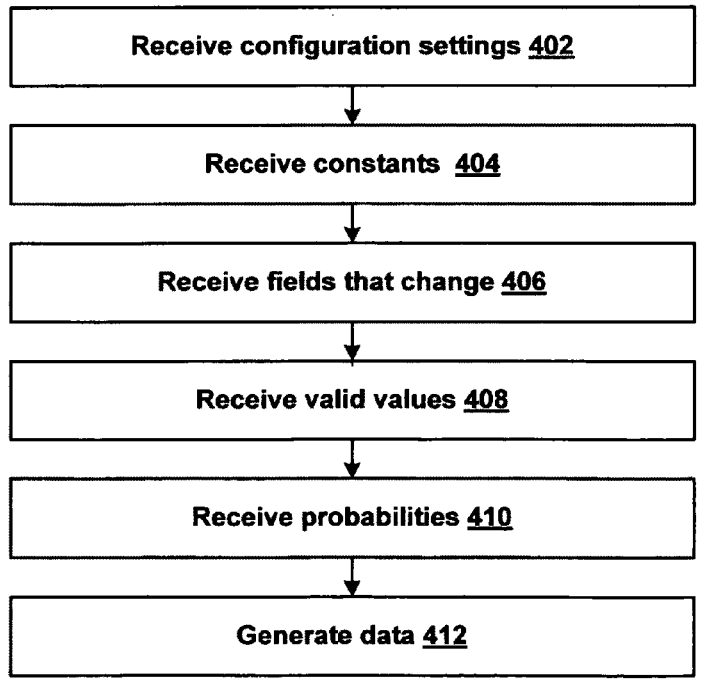
FIGS. 3a and 3b illustrate sample files in accordance with some embodiments of the invention.
FIG. 4 is an illustration of a sample data simulator directives and values processor process in accordance with some embodiments of the invention.

An example of a constants section may be:
[Constant]
SKU=RetailDemoProductList.csv
StoreM=RetailDemoStoreList.csv In this sample constants section, (identified by the "[Constant]" statement, there are 2 files that include constant information. In the given example, the RetailDemoProductList.csv file is an excel file as represented in FIG. 3a which provides constant data for SKUs and RetailDemoStoreList.csv is an excel file as represented in FIG. 3b which provides constants data for StoreID. These files provide data that may be inserted in the record when a particular key value is encountered. For example a particular SKU key value n may represent a 12 oz package of cheese twists of a certain wholesale cost and retail price produced by a particular manufacturer, etc. Whenever the SKU value n is randomly selected by the data simulator(s), this constant set of information may be inserted into the generated record.

The transaction section may include directives for the simulator to create a set of related records in which the specified set of fields change within the set of related records. That is, in some embodiments of the invention, some fields in each record in the set of related records change and other fields in each record in the set of related records are constant. For example, a directive such as "Columns=name1,name2, . . . namen" may specify fields in the set of records that have changing field values. A directive such as "MaxRecords=number" may specify a maximum number of records to be simulated by the data simulator for this set of related records.

An example of a transaction section may be:
[Transaction]
Columns=SKU,Units,Campaign
MaxRecords=10

In this transaction section (identified by the "[Transaction]" statement, the fields that change within a set of [MaxRecords] records, (i.e., in this case within a set of 10 related records), are the SKU field, the Units field and the Campaign field. The maximum number of records to be simulated by the data simulator for this set of records is 10 records.

The column names section may include the set of column numbers with related column names in each record in the set of records. For example, 1=SalesPerson indicates that the first column in the set of records (the first field in each record) includes the name of a sales person.

An example of a column names section may be:
[Column Names]
1=SKU
2=Units
3=Time/Date
4=StoreID
5=Customer
6=Campaign
7=Employee Id
8=TransID In this column names section (identified by the "[Column Names]" statement, the first field in a record may hold SKU data of an item or items sold, for instance, the second field may hold the number of units sold, the third the time and date of the sale, the fourth a store identifier at which the sale took place, a fifth the name of the customer who purchased the item(s), a sixth a campaign identifier, a seventh an employee identifier and an eighth a transaction identifier.

The values section may include the set of column names that have related values. For example, SalesPerson=Bill,Tom, Sally may indicate that a universe of sales people includes sales person Bill, sales person Tom and sales person Sally.

An example of a value section may be:
[Value]
SKU=3000001350,3000263932,3700013967,
  3700013974,3700013981,10887063524,11
  110087768,11110094971,11110095039,11110095077,
  11110095619,11110367433,11110 401014,
  11110401212,11110411013,11110416001,
  11110416605,11110417008,11110418
  258,11110420091,11110491053,11110585011,
  11110585066,11110586063,11110586247,
  11110586292,11110586780,11110586919,
  11110586995,11110587473,11110609199,11
  141911889,11141911926,11141912183,11141912299,
  11141912404,11141912503,12000
  000133,12000000270,12000001130,12000002397,
  16000869899,16000872004,16000876
  507,16000884502,18200000058,18200000164,
  28400001748,28400003162,28400008679,
  28400009065,28400010290,28400011853,
  28400014724,28400019446,34100000042,34
  100000059,38000005121,38000005305,49000000443,
  49000000702,49000002508,49000
  003017,54900000073,54900000080,54900000905,
  54900021092,71990000011,71990000 073
Units=# Range #1-3#
Time/Date=@Date@2001/01/01-2007/12/31@
StoreID=1001,1002,1110,1125,1143,1202,1256,1289,
  1593,1600,3002,3010,3050,3122,3
  333,4060,4075,4083,4094,4206,4242,4282,4299,4300,
  4350,4379,6020,6030,6040,6050,6
  060,6070,6080,6090,8001,8002,8003,8004,8005,8006,
  8007,8008,8009,9000,9100,9200,9
  300,9400,9500,9600
Customer=# Range #100-199#
Campaign=None,2-For-1,Coupon,Store Special,Manufacturer Discount,Clearance
Employee Id=# Range #123456-123999#
TransID=# Sequence #8000000#
In this sample values section (identified by the "[Value]" statement, the statement: SKU=3000001350,
  3000263932,3700013967,3700013974,3700013981,
  10887063524,11
  110087768,11110094971,11110095039,11110095077,
  11110095619,11110367433,11110
  401014,11110401212,11110411013,11110416001,
  11110416605,11110417008,11110418
  258,11110420091,11110491053,11110585011,
  11110585066,11110586063,11110586247,
  1110586292,11110586780,11110586919,
  11110586995,11110587473,11110609199,11
  141911889,11141911926,11141912183,11141912299,
  11141912404,11141912503,12000
  000133,12000000270,12000001130,12000002397,
  16000869899,16000872004,16000876
  507,16000884502,18200000058,18200000164,
  28400001748,28400003162,28400008679,
  28400009065,28400010290,28400011853,
  28400014724,28400019446,34100000042,34

100000059,38000005121,38000005305,49000000443,
49000000702,49000002508,49000
003017,54900000073,54900000080,54900000905,
54900021092,71990000011,71990000 073 may indicate that value SKU numbers must be one of the SKU numbers listed (e.g., SKU number 3000001350, SKU number 3000263932 . . . SKU number 71990000073).

The statement
Units=# Range #1-3# may indicate that valid values for number of units sold fall between the range of numbers listed (i.e., between one and three units in the example).

The statement:
Time/Date=@Date@2001/01/01-2007/12/31@ may indicate that a valid date for this universe of data falls within the range of dates between Jan. 1, 2001 and Dec. 31, 2007.

The statement:
StoreID=1001,1002,1110,1125,1143,1202,1256,1289,
1593,1600,3002,3010,3050,3122,3
333,4060,4075,4083,4094,4206,4242,4282,4299,4300,
4350,4379,6020,6030,6040,6050,6
060,6070,6080,6090,8001,8002,8003,8004,8005,8006,
8007,8008,8009,9000,9100,9200,9
300,9400,9500,9600 may indicate that a valid store identifier is one of: 1001, 1002, 1110, 1125, 1143, 1202, 1256, 1289, 1593, 1600, 3002, 3010, 3050, 3122, 3333, 4060, 4075, 4083, 4094, 4206, 4242, 4282, 4299, 4300, 4350, 4379, 6020, 6030, 6040, 6050, 6060, 6070, 6080, 6090, 8001, 8002, 8003, 8004, 8005, 8006, 8007, 8008, 8009, 9000, 9100, 9200, 9300, 9400, 9500 and 9600.

The statement:
Customer=# Range #100-199# may indicate that a valid customer number will fall between 100 and 199.

The statement:
Campaign=None,2-For-1,Coupon,Store Special,Manufacturer Discount,Clearance may indicate that individual store campaigns may be none (no specials), a 2-For-1 special, a coupon special, a store special, a manufacturer discount special or a clearance special.

The statement:
Employee Id=# Range #123456-123999# may indicate that a valid employee identification number lies within the range of numbers 123456 and 123999.

The statement:
TransID=# Sequence #8000000# may indicate that a transaction identification number is to be added to the record in sequence starting with number 8000000.

The probability section may indicate the probability values for individual field values for the data that is to be generated by the data simulator. For example, the statement "SalesPerson:Bill=85%" may indicate to the data simulator that 85% of the records generated by the data simulator should have sales person Bill as the salesperson. In some embodiments of the invention, if there is only one probability statement and thus only one probability percentage given, the remainder of records generated are divided substantially equally between the other possibilities. Thus in the case where there are 3 possible sales people, and 85% of the records are to indicate sales person 1, the other 15% of the generated records are split between the other two sales people, (e.g. Bill records comprise 85% of the records generated and the remaining 15% of the records generated will be divided between Sally (7.5%) and Tom (7.5%).

If more than one probability statement is provided to the data simulators, the remainder of the records are split between the remaining options. For example, the probabilities section could include the following statements:
SalesPerson:Bill=30%
SalesPerson:Sally=10%

Given the universe of three sales people, Bill, Tom and Sally, in this case the data simulator based on the provided probability directives, would generate 30% of the records with Bill as the salesperson, 10% of the records with Sally as the salesperson and the remaining 60% (100%−(30%+10%)) of the records with Tom as the sales person.

An example of a probabilities section may be:
[Probability]
Campaign:2-For-1=10%
Campaign:Coupon=40%
Campaign:Store Special=20%

This series of statements indicates to the data simulator that it should produce 10% of the records with a campaign value of "2-For-1", 40% of the records with a campaign value of "Coupon", 20% of the records with a campaign value of "Special" and the remaining 30% of the records substantially equally divided between "None", "Manufacturer Discount" and "Clearance". Hence, if the following directives were provided to the data simulator:
[Configuration]
Fields=8
Variables=100
Threads=1
LearnDirect=1
[Context]
SKU=RetailDemoProductList.csv
StoreID=RetailDemoStoreList.csv
[Transaction]
Columns=SKU,Units,Campaign
MaxRecords=10
[Column Names]
1=SKU
2=Units
3=Time/Date
4=StoreID
5=Customer
6=Campaign
7=Employee Id
8=TransID
[value]
SKU=3000001350,3000263932,3700013967,
3700013974,3700013981,10887063524,11
110087768,11110094971,11110095039,11110095077,
11110095619,11110367433,11110
401014,11110401212,11110411013,11110416001,
11110416605,11110417008,11110418
258,11110420091,11110491053,11110585011,
11110585066,11110586063,11110586247,
11110586292,11110586780,11110586919,
11110586995,11110587473,11110609199,11
141911889,11141911926,11141912183,11141912299,
11141912404,11141912503,12000
000133,12000000270,12000001130,12000002397,
16000869899,16000872004,16000876
507,16000884502,18200000058,18200000164,
28400001748,28400003162,28400008679,
28400009065,28400010290,28400011853,
28400014724,28400019446,34100000042,34
100000059,38000005121,38000005305,49000000443,
49000000702,49000002508,49000

003017,54900000073,54900000080,54900000905,
54900021092,71990000011,71990000 073
Units=# Range #1-3#
Time/Date=@Date@2001/01/01-2005/12/31@
StoreID=1001,1002,1110,1125,1143,1202,1256,1289,
1593,1600,3002,3010,3050,3122,3
333,4060,4075,4083,4094,4206,4242,4282,4299,4300,
4350,4379,6020,6030,6040,6050,6
060,6070,6080,6090,8001,8002,8003,8004,8005,8006,
8007,8008,8009,9000,9100,9200,9
300,9400,9500,9600
Customer=# Range #100-199#
Campaign=None,2-For-1,Coupon,Store Special,Manufacturer Discount,Clearance
Employee Id=# Range #123456-123999#
TransID=# Sequence #8000000#
[Probability]
Campaign:2-For-1=10%
Campaign:Coupon=40%
Campaign:Store Special=20% a first set of records produced by the data simulator in accordance with the provided directives might be:
Record 1 of 10:
SKU*11110095039*DELI BITE SIZE PRETZELS*15/20 oz*1.49*1.75*Kroger*Kroger*Midwest*Chip~Units*1~Time/Date*2001/01/07~StoreID*3122*A&P*GA*grocery~Customer*112~Campaign*Coupon~Employee ID*123458~TransID*8000000
Record 2 of 10:
SKU*11110586063*Classic Sharp Cheddar Cheese*2 lb*4.07*4.79*Kroger*Kroger*Midwest*Cheese~Units*3~Time/Date*2001/01/07~StoreID*3122*A&P*GA*grocery~Customer*112~Campaign*None~Employee ID*123458~TransID*8000000
Record 3 of 10:
SKU*11110491053*BIG K COLA*12 FL OZ*0.21*0.25*Kroger*Kroger*Midwest*Soda~Units*2~Time/Date*2001/01/07~StoreID*3122*A&P*GA*grocery~Customer*112~Campaign*Store Special~Employee ID*123458~TransID*8000000
and so on.

It will be appreciated that within the set of 10 records, Time/Date, StoreID, Customer, Employee ID and TransID remain the same, information from the constants files are appended to each record, the information being constant for each identifier (e.g., SKU in the RetailDemoProductList file and StoreId in the RetailDemoStoreList file). That is, SKU 11110586063 in the RetailDemoProductList file is always associated with the *Classic Sharp Cheddar Cheese*2 lb*4.07*4.79*Kroger*Kroger*Midwest*Cheese information and StoreID 3122 in the RetailDemoStoreList file is always associated with the A&P*GA*grocery information). Within the set of records, SKU and Units change randomly within the set of allowable values defined within the values section for those fields. Campaign varies according to the probabilities defined within the probabilities section so that over the entire universe of records produced by the data simulator(s), the specified percentages of each type of campaign are generated.

In the next set of 10 records the information that did not change (in the example, Time/Date, StoreID, Customer, Employee Id and TransID are randomly generated for the first record and repeated within the rest of the set of 10 records, while the SKU, Units and Campaign are treated as they were in the first set of records. Hence, a possible second set of 10 records might be:
Record 1 of 10:
SKU*16000869899*RAISIN NUT BRAN*15 oz*3.52*4.29*General Mills*General Mills*North*Cereal~Units*2~Time/Date*2002/05/27~StoreID*1600*Kroger*TX*super market~Customer*181~Campaign*None~Employee ID*123559~TransID*8000001 and so on.

FIG. 4 illustrates a process for creating data representing a scenario, the scenario representing the characteristics of a particular universe of data. At 402 configuration settings as described above are received by the simulator(s), either directly from the directives file or from the values and directives processor. In some embodiments of the invention, a single file is created in which all directives are stored. Alternatively, one file may be provided for each type of directive (configuration, constants, values, etc.), or several types of directives may be grouped together in one file or some combination of the two may be provided. Similarly, one or more files may be specified within each file. For example, in the sample developed above, RetailDemoStoreList file is specified within the constants section of the directives file. The directives file may be a text file with a file extension of .txt or may be any appropriate type of file. At 404 constants for the data as described above are received by the simulator(s). At 406 fields that are to change within the sets of records as described above are received by the simulator(s). At 408 allowable values for the fields as described above are received by the simulator(s). At 410 probabilities as described above are received by the simulator(s). At 412 the directives and values processor or data simulators generate data as described above. The data simulator(s) may receive the directive from files provided to them from the values and directives processor, from files provided directly to the data simulators or from the command line. The directives and values processor may receive the directive from files provided directly to it or from the command line.

Figure 8:
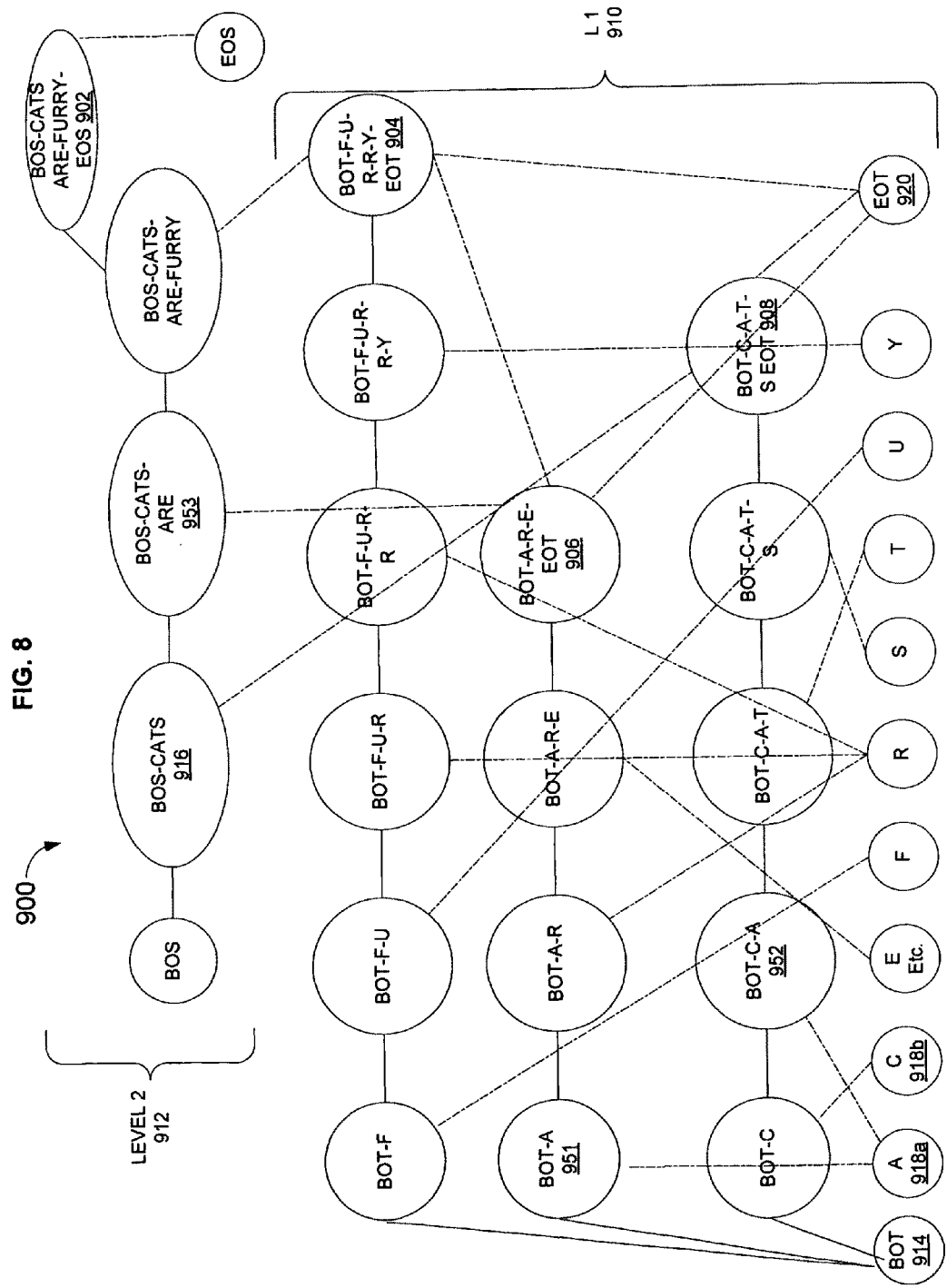
FIG. 8 illustrates a node diagram of a portion of a KStore structure in accordance with embodiments of the invention.

As is described in earlier filed patents and as illustrated in FIG. 8, each layer or level (e.g., level 1 910 and level 2 912) of the tree-based datastore 900 comprises a first (Case or asCase) tree or branch (represented by solid linking lines) that depends from a first root node (e.g., node 914) and may include a plurality of branches. It will be appreciated that FIG. 8 illustrates only a portion of a KStore and furthermore, that only some of the paths of the portion of the data structure illustrated in FIG. 8 appear in FIG. 8. The first root may represent a concept, such as but not limited to, a level begin indicator (such as B-O-T (BOT) or beginning of thought). Each of the branches of the first tree ends in a leaf node. Each leaf node may represent an end product (e.g., nodes 904, 906, 908). A second root (e.g., node 920) of the same level of the tree-based datastore is linked to each leaf node of the first tree that represents an end product. Hence, the second root is essentially a root to an inverted order of the first tree or subset of the first tree, but the first tree is not duplicated. The second root may represent a concept, such as but not limited to, a level end indicator (such as E-O-T (EOT) or end of thought). Finally, the tree-based datastore comprises a plurality of trees (Result trees or asResult trees or branches represented by dashed linking lines) in which the root node of each of these trees may include data such as a dataset element or a representation of a dataset element (e.g., nodes 918a, 918b, etc.). This type of root node is referred to herein as an elemental root node. The elemental root node of each of these trees may be linked to one or more nodes in one or more branches of the unduplicated first tree. The non-root nodes of the tree-based datastore may include only pointers to other nodes in the tree-based datastore, or may include additional fields wherein one such additional field may be a count field representing the number of times the node has been traversed. The roots of the trees in the forest of trees comprising each level of the tree-based datastore are also comprised of pointers, however the root nodes may, in addition, include data that represents information (i.e., include data that is or represents data such as dataset elements or concepts such as level begin or level end indicators); all the other nodes of the tree-based datastore only point to other nodes and include essentially no data. As an example, the data may be an integer that is associated with a character, a pixel representation, a condition such as begin indicator, end indicator, beginning of field indicator or the like, although the invention is not so limited. Multiple levels of the above-described tree-based datastore may be generated and accessed, the end products of a lower level becoming the elemental root nodes of the next level, (e.g., Level or layer 2 912 comprises a BOS (beginning of second layer thought) node linked to a BOS-CATS node 916 linked to a BOS-CATS-ARE NODE 953 linked to a BOS-CATS-ARE-FURRY node linked to a BOS-CATS-ARE-FURRY-EOS node 902 linked to an EOS (end of thought for the second level node) in an asCase tree.

Thus, the interlocking trees datastore comprises a multi-rooted tree of asCase branches forming one asCase tree depending from a first root and asResult branches forming multiple asResult trees depending from multiple roots. One special instance of an asResult Tree comprises a root node that is linked to one or more end product leaf nodes of the asCase tree described above. Hence this asResult tree can easily access the branches of the asCase tree terminating in end products, in inverted order. This asResult tree can also be used to define elemental root nodes for the next level. These elemental root nodes may represent dataset elements for the next level, composed of the set of end products of the lower level.

The interlocking trees datastore may capture information about relationships between dataset elements encountered in an input file by combining a node that represents a level begin indicator and a node that represents a dataset element to form a node representing a subcomponent. A subcomponent node may be combined with a node representing a dataset element to generate anther subcomponent node in an iterative sub-process. Combining a subcomponent node with a node representing a level end indicator may create a level end product node (e.g., node 902). The process of combining a level begin node with a dataset element node to create a subcomponent and combining a subcomponent with a dataset element node and so on may itself be iterated to generate multiple asCase branches in a level. AsResult trees may also be linked or connected to nodes in the asCase tree, such as, for example, by a root of an asResult tree pointing to one or more nodes in the asCase tree.

End product nodes of one level may be the elemental root nodes representing dataset elements that are combined to generate a next level of subcomponents. The process can be repeated any number of times, creating any number of levels of asCase trees. Additionally, elemental root nodes of a level may be decomposed to generate lower level nodes and roots. End product nodes of one level become the elemental root nodes of the next level through a special instance of an asResult tree of the lower level, that is, the asResult tree of the lower level having the root node that represents the lower level ending indicator. The asResult tree of the lower level having the root node that represents the lower level ending indicator, thus, is a second root into an inversion of the asCase tree of the lower level.

In some embodiments of the invention, as nodes are created, asCase and asResult links are essentially simultaneously generated at each level. AsCase branches are created by the generation of the asCase links as the input is processed. The asCase branches of the asCase tree on each level provide a direct record of how each subcomponent and end product of the level was created through the sequential combination of nodes representing dataset elements into subcomponent and so on to end products. The branches of the asCase tree also represent one possible hierarchical relationship of nodes in the tree.

The generation of the asResult links creates a series of interlocking trees, each of which depends from a separate root. There may be multiple roots of this type in a level. This has the result of recording all the other relationships between the dataset elements encountered in the input. The aforementioned information is captured by the structure of the forest of interlocking trees that is built rather than explicitly stored in the nodes of the trees, so that in effect the data that is received as input determines the structure of the forest of interlocking trees that is built. The structure of the forest of asResult trees ensures that the information so stored can be accessed in any other context required. Hence, the datastore is self-organizing. Furthermore, it will be appreciated that analysis data is generated automatically while the datastore is being created by creating the structure of the datastore.

The structure of the nodes themselves is generally maintained through a limited set of data fields per node. There are fields for the Case, the Result, the asCase list pointer, the asResult list pointer and additional fields including at least a count field in most forms of the structure, as well as a value field for each elemental root node.

Note that the K of FIG. 8 begins at a level of letters, and shows a second level of words. Each letter may be considered a "sensor" that is, each letter can be recognized as a particle. Adding each new letter allows for continued growth of the K. The K of FIG. 8 illustrates one possible submission of data: the three words in the following order, "CATS" "ARE" "FURRY". Suppose that the K of FIG. 8 accepts letters as particles. Accordingly, the Learn Engine providing an interface to the K Engine for this K must produce letters as particles. A first particle is "C." The node representing this particle will be located within the elemental root nodes. To record this as an event the elemental root node for "C" will be brought into relation with the current location pointer in K, which in this case is the BOT (Beginning Of Thought) node. Because this is the first occurrence of "C", a new node will be created representing BOT-C. The next particle will be A. Because this is the first occurrence of "A", a new node will be created representing BOT-A, node 951, and it will be accompanied by a pointer to the BOT-C node. The K Engine will go through the asCase list and for each of the subcomponent nodes on the asCase list of the BOT-C node and for each node it will look at the Result node to see if it matches and use that subcomponent to reset the current location pointer. In this case there are no nodes in the asCase list and it will not have found a match, so the K Engine will record this event as BOT C-A 952, a new subcomponent node, and put this new subcomponent node on the asCase list of the original location counter. The new subcomponent's address will then be set as the new current location. More precisely, The K Engine will see that there are no occurrences of A following BOT-C in the current structure and that a new node (node 952) will be required to record this particle event as BOT C-A. The next particle will be a T, and the record will be the new node presenting BOT C-A-T and so on until the end of the word is reached, creating an end product node, such as node 908, BOT-C-A-T-S EOT (EOT signifies End-Of-Thought). A similar process is used to create end product nodes 906 and 904.

Figure 7:
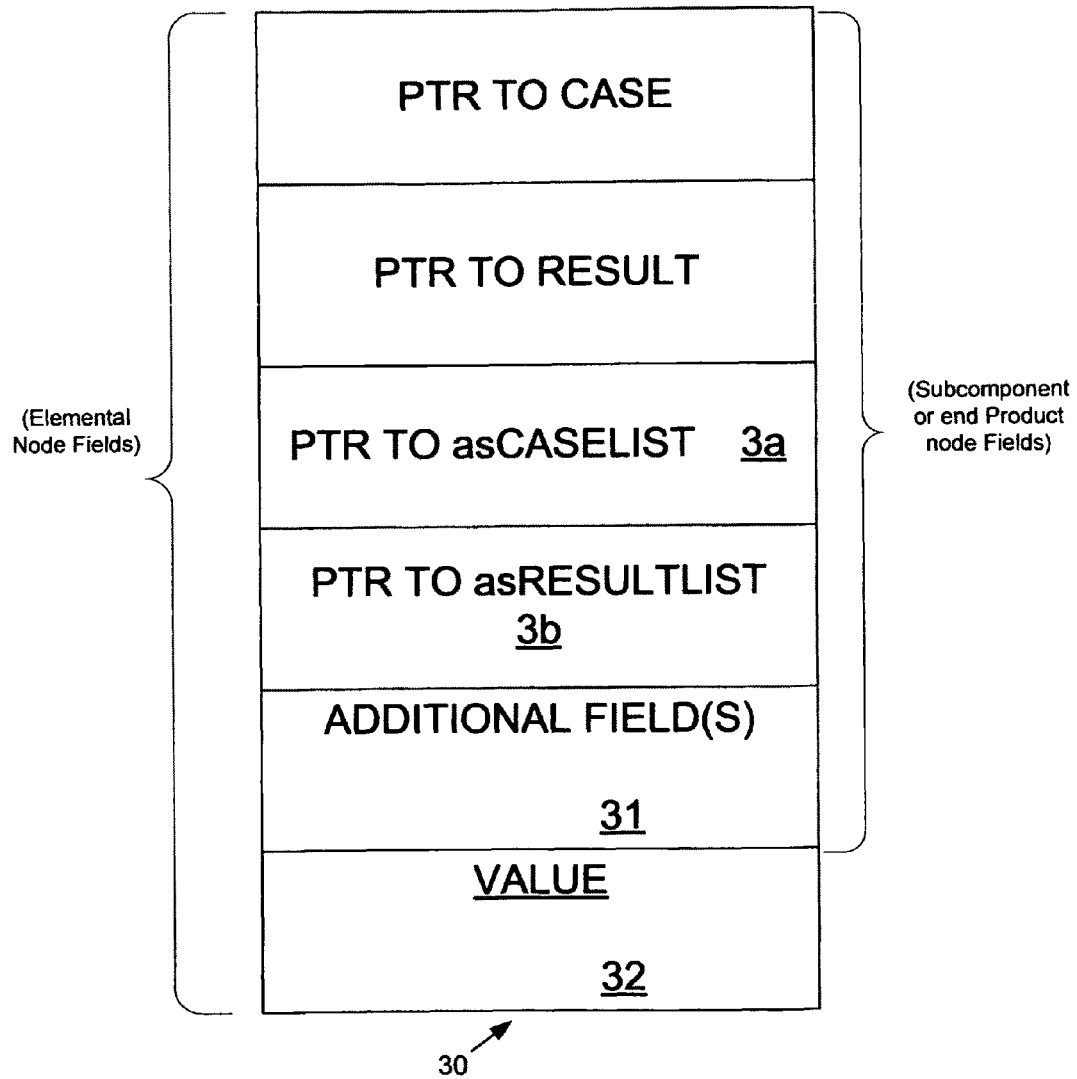
FIG. 7 illustrates a generalized node data structure of a KStore data structure in accordance with embodiments of the invention.

The nodes of the interlocking trees datastore will typically have a form as in FIG. 7 which illustrates the data fields of a typical node 30. Node 30 may include a string field, as the additional field 31, that includes a sequence that shows all of the elemental root nodes represented by this node. The addition of a string field including this sequence of elementals is helpful in debugging. There can be many uses for such additional fields and the nodes such as node 30 need not be limited to one additional field. Further, it will be appreciated that the pointer to asResult list field 3*b* will be null for all subcomponent nodes and that the pointer to asCase List field 3*a* will be null for the elemental nodes and for end product nodes. The exemplary node 30 may also include a count field as an additional field 31. The count field is initialized and incremented with an intensity variable, whose value varies with conditions at times when the count field is being referenced. (An intensity variable is defined as a mathematical entity holding at least one unchangeable value). By making this term so broad the intensity variable populated count field can be used for applications of the inventive interlocking trees structure to processes dealing with forgetting erroneous recorded data, recording which entity is doing the inquiry, recording the type of inquiry being used, and other processes of interest which may be derived when using the data. A simple example form of an intensity variable would be a single ordinal field value, such as '1' to be used to increment or decrement count fields to record the number of times that a node has been accessed or traversed. If the node were an elemental root node it would also include a value field 32. Most of this node construction is already discussed in prior applications U.S. Pat. Nos. 7,158,975 and 6,961,733, incorporated by reference above.

Figure 5:
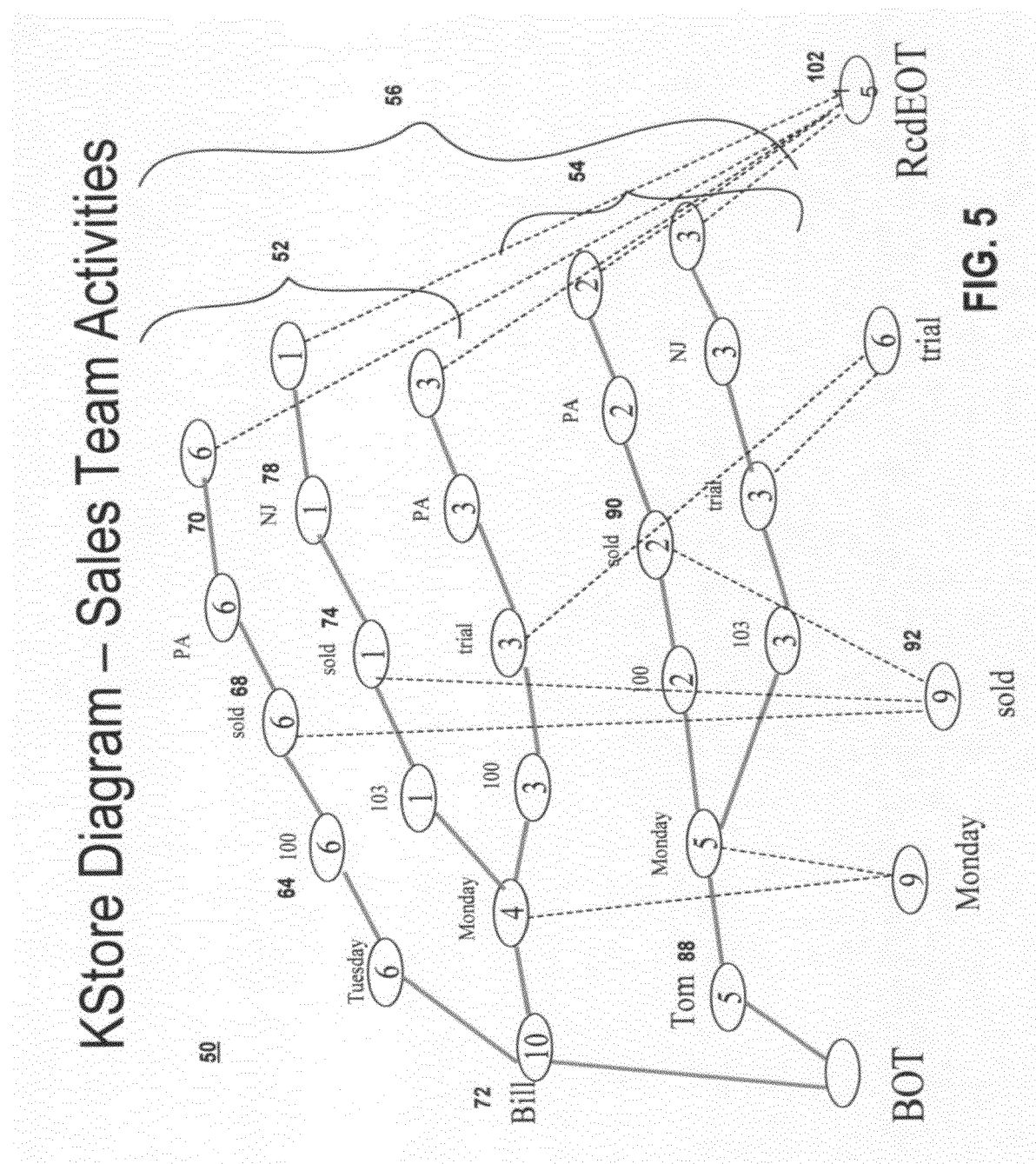
FIG. 5 represents a portion of an interlocking trees datastore created from single-scenario data, as described with respect to FIGS. 2a and 2b, in accordance with some embodiments of the invention.

FIG. 5 illustrates a portion of an interlocking trees datastore 50. The interlocking trees datastore 50 is a diagrammatic representation of a portion of a KStore such as KStore 140 of FIGS. 2*a* and 2*b*. It will be appreciated that in FIG. 5 only some of the paths of the portion of the data structure illustrated in FIG. 5 appear in FIG. 5. Aspects of the structure, functioning, creation and traversal of the interlocking trees datastore 50 is described in more detail in U.S. Pat. Nos. 6,961,733, and 7,158,975 and in the other patents and patent applications mentioned above. In FIG. 5, data records such as the data records shown in Table I below can be created by a data simulator or data simulators such as data simulators 126, 128 as directed by the declaratives file, and may represent datastream 134 or 136.

TABLE I

| Bill | Tuesday | 100 | sold | PA |
| Bill | Tuesday | 100 | sold | PA |
| Bill | Tuesday | 100 | sold | PA |
| Bill | Tuesday | 100 | sold | PA |
| Bill | Tuesday | 100 | sold | PA |
| Bill | Tuesday | 100 | sold | PA |
| Bill | Monday | 103 | sold | NJ |
| Bill | Monday | 100 | trial | PA |
| Bill | Monday | 100 | trial | PA |
| Bill | Monday | 100 | trial | PA |
| Tom | Monday | 100 | sold | PA |
| Tom | Monday | 100 | sold | PA |
| Tom | Monday | 103 | trial | NJ |
| Tom | Monday | 103 | trial | NJ |
| Tom | Monday | 103 | trial | NJ |

The fifteen data records of Table I may represent, for example, fifteen sales transactions handled by salesmen Bill and Tom. This information may be stored as shown in the KStore datastore 50. It will be appreciated that all of the data in Table I, the datastream and the datastore 50 have the same data format, and represent a single scenario. Thus, the datastore 50 may represent a single data source and context, the transactions scenario and may result from a single scenario definition in the declarative file (e.g., a scenario named transactions). Accordingly, the datastore 50 may be referred to as a single scenario datastore. The presence of fifteen data records in the datastore 50 is indicated by the count of the end-of-thought node 102 which is the sum of the counts of all end product nodes (i.e., 6+1+3+2+3) within the datastore 50. It will be understood that the term "transactions" as used here includes both the "trial" and "sold" data records. It will be appreciated that while the datastore illustrated is necessarily tiny to aid in understanding, an actual datastore may be immense.

The paths representing the fifteen transactions of Table I within the interlocking trees datastore 50 include paths that include "Bill" (paths 52) and paths that include "Tom" (paths 54). The "Bill" paths 52 are understood to include all of the paths extending from the "Bill" subcomponent node 72. The "Tom" paths 54 are understood to include all of the paths extending from the BOT node through the "Tom" subcomponent node 88. The "Bill" paths 52 and "Tom" paths 54 are collectively referred to as the scenario simulator process paths 56 of the interlocking trees datastore 50. Datastore 50 may be built from one or more datastreams generated by one or more threads of one or more data simulators. The paths forming the scenario simulator process paths 56 therefore may constitute a representation of a single scenario, such as sales transactions for a retail furniture store that has two salesmen named Bill and Tom. In more complex scenarios, the data may be in multiple formats, generated from multiple data simulators.

Using the interlocking trees datastore 50 it is possible to determine, for example, that Bill sold six items or units (with some characteristic "100" node 64) on Tuesday in Pennsylvania by referring to Case path 70 within Bill's paths 52. Furthermore, it is possible to determine that he sold one item (with some characteristic "103") on Monday in New Jersey by referring to path 78. Additionally, it is possible to determine the total number of items sold by either Bill or Tom by determining the number of times 'sold' is used within the interlocking trees datastore 50. This information can be determined by obtaining the count of the sold elemental root node 92. The count of the sold elemental root node 92 is nine (6 (node 68)+1 (node 74)+2 (node 90).

It will be appreciated that seven of the nine instances of 'sold' occur in Bill's paths 52, and that the remaining two instances occur in Tom's paths 54. In fact, it is an important feature of the interlocking trees datastore 50 that as the data structure is built, the data is automatically being analyzed, so that as the data structure is being built, query solutions are also built into the data structure automatically. An elemental root node such as the sold elemental root node 92 can be used in various different paths of a datastore 50 regardless of the logical relationship, or lack of a logical relationship, between the various paths.

Figure 6:
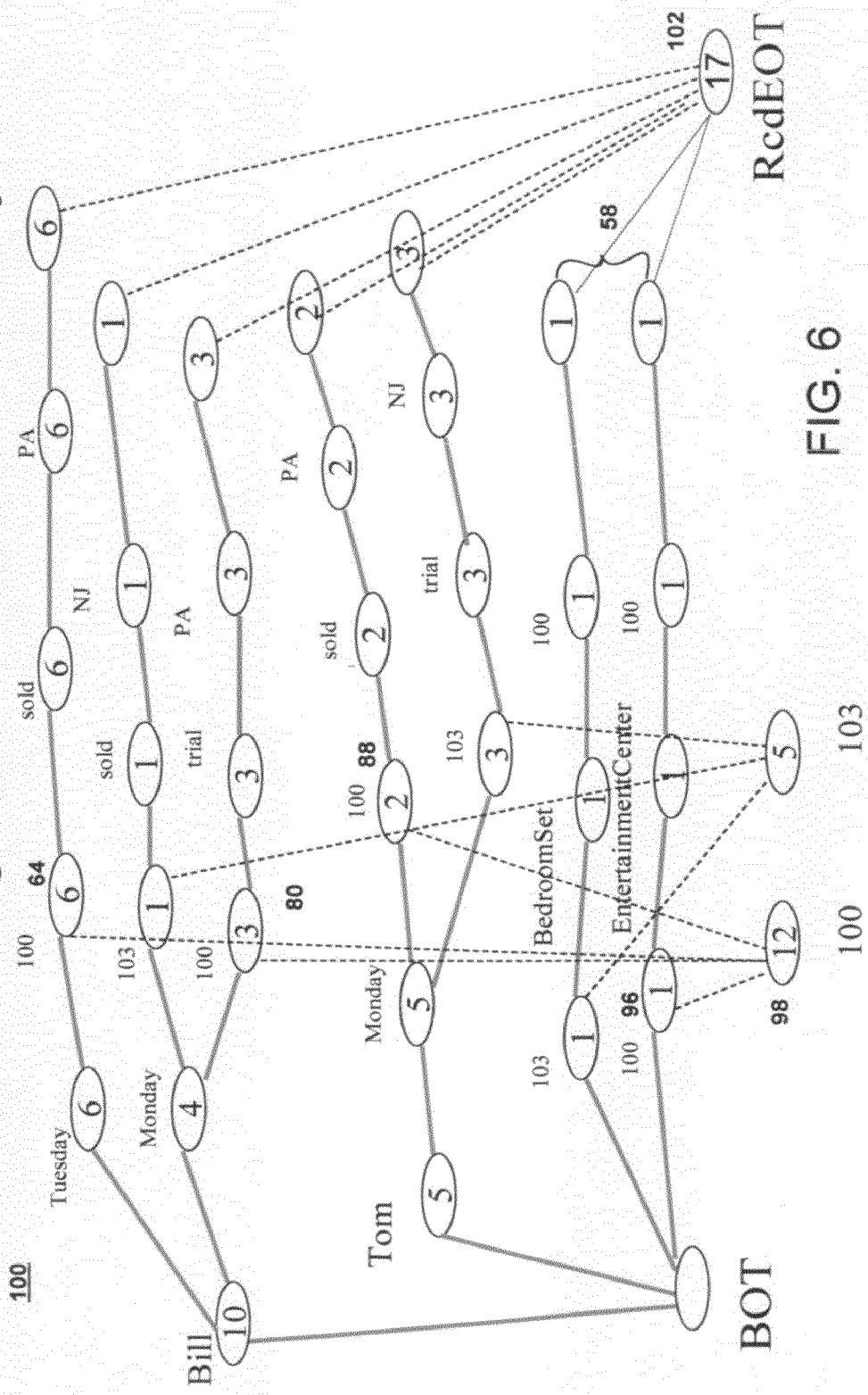
FIG. 6 represents a portion of an interlocking trees datastore created from multiple-scenario data, as described with respect to FIGS. 2a and 2b, in accordance with some embodiments of the invention.

FIG. 6 represents a portion of an interlocking trees datastore 100. It will be appreciated that FIG. 6 illustrates only a portion of a KStore and furthermore, that only some of the paths of the portion of the data structure illustrated in FIG. 6 appear in FIG. 6. Within the interlocking trees datastore 100 in addition to Bill's paths 52 extending from the "Bill" subcomponent node 72 and Tom's paths 54 extending from the "Tom" subcomponent node 88 comprising the transactions scenario, the interlocking trees datastore 100 also includes paths 58, referred to as the inventory scenario. That is, KStore 140 is represented in FIG. 6 as the interlocking trees datastore 100 and includes both transaction information and inventory information. The inventory information is shown in Table II below.

TABLE II

| 103 | BedroomSet | 50 |
| 100 | EntertainmentCenter | 60 |

It will be appreciated that the transaction information and the inventory information are in two different data formats. In some embodiments of the invention, a datastore such as datastore 100 is built from multiple datastreams generated by multiple data simulators based on a plurality of scenario definitions in the declarative file. The addition of the two records shown in Table II to the interlocking trees datastore 100 causes the count of the end of thought node to rise from fifteen, for the end of thought node 102 of the interlocking trees datastore 50, to seventeen, for the end of thought node 102 of FIG. 6. Fifteen of the seventeen records in the interlocking trees datastore 100 are from the transaction scenario and two are from the inventory scenario. In some embodiments of the invention, the data record of Tables I and II could be provided with a field having two valid variables representing transactions and inventory in order to create the interlocking trees datastore 100.

Within the interlocking trees datastore 100, elemental root node 98 represents the number "100." The elemental root node 98 has a count of twelve, indicating that "100" occurs a total of twelve times in the datastore 100. Eleven of the twelve occurrences of "100" are in the scenario simulator path 56: nine are in Bill's paths 52 (see subcomponent nodes 64, 80) and two are in Tom's paths 54 (see subcomponent node 88). The one remaining occurrence of the number '100' represented by elemental root node 98 comes from the inventory scenario data 58 (see subcomponent node 96). Thus, the number "100" is used in the data from both scenarios. Furthermore, it may be used in different ways in the different scenarios. For example, in the scenario data, the number "100" can indicate a value of a transaction, for example $100.00. In the inventory scenario it can indicate an item number and thus the identity of the item that is being inventoried. Thus, it will be appreciated that particles or sequences represented by an elemental root node (or root node, depending on the level perspective of the view of K) in the system and method of the present invention can be used in data representing a plurality of different scenarios to represent entirely different types of variables.

The various techniques described herein may be implemented in connection with hardware or software or, where appropriate, with a combination of both. Thus, the methods and apparatus of embodiments of the invention, or certain aspects or portions thereof, may take the form of program code (i.e., digitally encoded instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of embodiments of the invention, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While embodiments of the invention have been described in connection with the figures, it is to be understood that other similar embodiments may be used or modifications and additions may be made to the described embodiments for performing the same functions without deviating there from. Therefore, the invention should not be limited to any single embodiment, but rather should be construed in breadth and scope in accordance with the appended claims.

What is claimed:

1. A method of generating scenario data within a programmable processing system, the method comprising:
   receiving directives comprising:
     configuration directives comprising a number of fields in a record, a number of threads to be initiated for generating the scenario data and a location to send the scenario data;
     constants directives, wherein constants directives comprise constant data to be inserted in each record in a datastream, the constant data based on a key value of an indicated field;
     change directives, wherein change directives list fields that change within a set of a specified number of related records;
     value directives, wherein value directives provide valid values for at least one field in the record;
     probabilities directives, wherein a set of probabilities directives comprise at least one percentage, the percentage specifying a proportion of the set of related records wherein a field in the set of related records comprises a particular value; and
   generating a datastream of records in accordance with the received directives.

2. The method of claim 1, wherein the directives are received by a data simulator and wherein the data simulator generates the datastream of records.

3. The method of claim 1, wherein the directives are received from a scenarios simulator processor, the scenarios simulator processor invoking one or more data simulators.

4. The method of claim 1, wherein the directives are received from a command line.

5. The method of claim 1, wherein the directives further comprise a set of valid values for at least one of the fields of the records and wherein the directives comprise a number of records to create in the related set of records wherein unchanged fields are constant within the set of related records.

6. The method of claim 1, wherein the set of probabilities comprises a plurality of percentages whose sum is less than 100%, wherein a remaining unspecified percentage of records generated are selected randomly from among a remaining unspecified set of valid values for the field.

7. The method of claim 1, wherein a KStore is generated from the datastream, a KStore comprising root nodes and non-root nodes organized into a plurality of connected trees, the plurality of connected trees comprising a tree of a first type comprising a first root and at least one of a plurality of non-root nodes and at least one of a plurality of trees of a second type, wherein the second tree type comprises a second root node and a plurality of non-root nodes common with the nodes of the tree of the first type, wherein the nodes of the datastore include at least one elemental node, one subcomponent node and one end product node and wherein the at least one elemental node comprises a first null pointer, a second null pointer, a third null pointer and a fourth pointer pointing to a second list of pointers to nodes, the second list comprising nodes which include the elemental node as their second portion, the KStore comprising a set of interlocking trees comprising a multi-rooted tree of asCase branches forming an asCase tree depending from a first root and asResult branches forming multiple asResult trees depending from multiple roots, wherein an asResult tree comprising a second root node linked to an end product leaf node of the asCase tree accesses the branches of the asCase tree terminating in end products, in inverted order.

* * * * *